Patented Aug. 7, 1934

1,969,516

UNITED STATES PATENT OFFICE 1,969,516

PRODUCTION OF ALKALI METAL CARBAMATES

Robert Burns MacMullin, Niagara Falls, N. Y., assignor to The Mathieson Alkali Works, Inc., New York, N. Y., a corporation of Virginia No Drawing. Application April 6, 1934, Serial No. 719,337

15 Claims. (Cl. 260—112)

This invention relates to improvements in the production of alkali-metal carbamates from alkali-metal bicarbonates. The present invention is an improvement in the invention disclosed in application Serial No. 602,398, filed March 31, 1932, by George L. Cunningham, Wesley K. McCready and myself, which has matured into Patent No. 1,964,723, dated July 3, 1934.

In carrying out the invention described in that prior application for the production of sodium carbamate for example, sodium bicarbonate is subjected to treatment with anhydrous ammonia or with an aqueous solution of ammonia containing from 35-50% to 100%, as a limit, $NH_3$. Concentrations of about 75-90% $NH_3$ are particularly advantageous. The reaction proceeds as follows:

$$NaHCO_3 + NH_3 = NaNH_2CO_2 + H_2O$$

If the concentration of the aqueous ammonia solution is too low, sodium sesqui carbonate will form instead of sodium carbamate. This lower limit approximates 35% $NH_3$. Other ammonia-containing salts are also formed, in some cases with $NH_3$ concentrations just above 35%. With anhydrous ammonia or with the higher concentrations of aqueous ammonia, the reaction proceeds but very slowly. The invention there described is applicable with particular advantage to crude ammonia soda; further, when the concentration of the aqueous ammonia solution becomes too low, its remaining ammonia content may be recovered by distillation.

I have now discovered that if the invention described in the aforesaid application is carried out at a temperature upwards of 50° C., advantages as to conversion and the time required for reaction are to be obtained. These advantages include, (1) speeding of the time required for reaction, and (2) good conversion. As hereinafter noted, while the present invention is of advantage in the formation of the carbamates of the alkali metals generally it is particularly so in the case of potassium. Temperatures of 50° C. to 90° C. are particularly advantageous.

According to the present invention the bicarbonate of the alkali-metal, the carbamate of which is desired, sodium or potassium bicarbonate, for example, is subjected to treatment with anhydrous liquid ammonia or an aqueous solution of ammonia at a temperature upwards of 50° C. and the carbamate formed separated and removed while maintaining the concentration of the aqueous ammonia solution at 35% or upwards (by weight) of $NH_3$. The separation may be accomplished by filtration, for example, or by any other suitable means.

The following examples will illustrate the invention:

1. Equal parts by weight of $KHCO_3$ and anhydrous $NH_3$ were reacted together at a temperature of 50° C. and an absolute pressure of 287 pounds per square inch. After reaction, the mother liquor comprised about 50% water. The yield consisted of about 94% $KCO_2NH_2.H_2O$ and 6% $KHCO_3$. Filtration was effected at 50° C.

2. Equal parts by weight of $KHCO_3$ and anhydrous $NH_3$ were reacted together at a temperature of 70° C. and an absolute pressure of 478 pounds per square inch. The reaction took 7 hours and gave

| | Percent |
|---|---|
| $KCO_2NH_2$ | 72.0 |
| $KHCO_3$ | 23.5 |
| $K_2CO_3$ | 4.5 |

After reaction, the mother liquor contained about 20% $H_2O$. Filtration was effected at 70° C. The absolute pressure at the end of the reaction was about 417 pounds per square inch.

3. $NaHCO_3$ and anhydrous $NH_3$, equal parts by weight, were reacted together at 50, 70 and 90° C. After reaction, the mother liquor contained about 21% $H_2O$. The yields consisted of 88 to 97% $NaCO_2NH_2$ with from 3 to 12% unconverted $NaHCO_3$. Filtration was effected at 50, 70 and 90° C. respectively. The absolute pressures at the start of the reactions were 287, 478 and 738 pounds per square inch respectively and at the end of about 250, 417 and 643 pounds per square inch respectively.

The proportions of the reacting materials are not critical. An excess of ammonia is desirable, however, as carbamate formation is promoted by excess $NH_3$. High initial concentrations of $NH_3$ are advantageous. Concentrations of 75-95% $NH_3$ (by weight), for example, are advantageous.

As the nature of the product depends on the final conditions at the time of separation, care should be taken that proper conditions are maintained at the time of separation. To illustrate, if the concentration of the aqueous ammonia solution is too low, compounds other than that desired will be formed. In the case of sodium, for example, if the concentration of the aqueous ammonia solution is too low, sodium sesquicarbonate will form instead of sodium carbamate. This lower limit approximates 35% $NH_3$. Other ammonia-containing salts are also formed, in some cases, with $NH_3$ concentrations just above 35%. Difficulties due to too low an ammonia concentration may be avoided by maintaining the $NH_3$ concentration at 35% or upwards.

With reference to the concentration of the aqueous solution of ammonia, it should be noted that since water is evolved in the reaction attending the formation of the carbamate the concentration of $H_2O$ in the $NH_3$ at the time of separation will depend on the proportion of $NaHCO_3$ to $NH_3$ originally brought together, as well as the initial concentration of $H_2O$ in the $NH_3$ used. Thus, if equal parts by weight of dry $NaHCO_3$ and anhydrous $NH_3$ are reacted, the mother liquor will contain 21.2% $H_2O$ and 78.8% $NH_3$. Care should be taken that the above factors are properly coordinated so as to maintain the concentration of $NH_3$ at 35% or upwards by weight.

Again the nature of the product depends upon the temperature at which the separation is effected. Thus if the reaction be carried out at 70° C., for example, and the mixture cooled down to a temperature of nearly −30° C., by flashing off $NH_3$, and the mixture filtered, both $KCO_2NH_2$ and $NaCO_2NH_2$ form ammoniates. That is, they take on ammonia of crystallization. On warming, these ammoniates dissociate, leaving the carbamate alone. Again, if the temperature of separation is 150° C. or over carbimides result, along with carbonates and cyanates. If however, the filtration is performed at 0 to 90° C. for example, or 0 to 70° C., the carbamates result direct. These ranges are, of course, subject to considerable latitude, but for practical reasons, one would not want to filter much below 0° C. (because of ammoniate formation, necessitating $NH_3$ recovery) or above 100° C. (necessitating apparatus capable of withstanding about 1,000 pounds per square inch pressure).

While temperatures from 50° C. to 90° C. have been stated to be particularly advantageous, it is to be understood that the invention contemplates the use of temperatures higher than 90° C. At temperatures higher than those recommended, the carbamate will form but its formation is accomplished along with the formation of other compounds; the amount of the contamination being determined partly by the temperature employed and partly by the length of the heating. Temperatures higher than 150–180° C. are not recommended as some decomposition of the carbamate takes place at these temperatures.

Conditions for the formation of potassium carbamate free from by-products are more restricted than those for sodium carbamate. The invention accordingly is of particular benefit in disclosing satisfactory conditions for the formation of $KCO_2NH_2$. Best results, in the case of $KCO_2NH_2$, appear to be obtained when the reaction is conducted at a temperature from 50–70° C., followed by separation at a temperature from 0–70° C. If these conditions are observed, a minimum decomposition to $K_2CO_3$ is secured. The reaction should be continued as long as necessary to secure good conversion at the conditions selected. Reaction to form the carbamate desired may be promoted by securing good contact between the reactants. This contact may be secured, in conventional manner, by stirring, mixing or other appropriate form of agitation. While the invention has been described with particular reference to the carbamates of sodium and potassium by using the other alkali-metal bicarbonates the corresponding alkali-metal carbamates may be produced.

I claim:

1. In the production of alkali-metal carbamates from alkali-metal bicarbonates, the improvement which comprises subjecting the bicarbonate to treatment with an aqueous solution of ammonia containing about 35–100% by weight of $NH_3$ at a temperature upwards of 50° C.

2. In the production of alkali-metal carbamates from alkali-metal bicarbonates, the improvement which comprises subjecting the bicarbonate to treatment with an aqueous solution of ammonia containing about 35–100% by weight of $NH_3$ at a temperature upwards of 50° C., and separating the carbamate thus formed while maintaining the concentration of the aqueous ammonia solution at 35% or upwards of $NH_3$.

3. In the production of sodium carbamate from sodium bicarbonate, the improvement which comprises subjecting the bicarbonate to treatment with an aqueous solution of ammonia containing about 35–100% by weight of $NH_3$ at a temperature upwards of 50° C.

4. In the production of potassium carbamate from potassium bicarbonate, the improvement which comprises subjecting the bicarbonate to treatment with an aqueous solution of ammonia containing about 35–100% by weight of $NH_3$ at a temperature upwards of 50° C.

5. In the production of alkali-metal carbamates from alkali-metal bicarbonates, the improvement which comprises subjecting the bicarbonate to treatment with an aqueous solution of ammonia containing about 35–100% by weight of $NH_3$ at a temperature of 50°–90° C.

6. In the production of alkali-metal carbamates from alkali-metal bicarbonates, the improvement which comprises subjecting the bicarbonate to treatment with an aqueous solution of ammonia containing about 35–100% by weight of $NH_3$ at a temperature upwards of 50° C., and separating the carbamate thus formed at a temperature of 0°–70° C.

7. In the production of alkali-metal carbamates from alkali-metal bicarbonates, the improvement which comprises subjecting the bicarbonate to treatment with an aqueous solution of ammonia containing about 35–100% by weight of $NH_3$ at a temperature upwards of 50° C., and separating the carbamate thus formed at a temperature of 0°–70° C., while maintaining the concentration of the aqueous ammonia solution at 35% or upwards of $NH_3$.

8. In the production of alkali-metal carbamates from alkali-metal bicarbonates, the improvement which comprises subjecting the bicarbonate to treatment with an aqueous solution of ammonia containing about 35–100% by weight of $NH_3$ at a temperature of 50°–90° C., and separating the carbamate thus formed while maintaining the concentration of the aqueous ammonia solution at 35% or upwards of $NH_3$.

9. In the production of sodium carbamate from sodium bicarbonate, the improvement which comprises subjecting the bicarbonate to treatment with an aqueous solution of ammonia containing about 35–100% by weight of $NH_3$ at a temperature upwards of 50° C., and separating the carbamate thus formed while maintaining the concentration of the aqueous ammonia solution at 35% or upwards of NH₃.

10. In the production of potassium carbamate from potassium bicarbonate, the improvement which comprises subjecting the bicarbonate to treatment with an aqueous solution of ammonia containing about 35–100% by weight of NH₃ at a temperature upwards of 50° C., and separating the carbamate thus formed while maintaining the concentration of the aqueous ammonia solution at 35% or upwards of NH₃.

11. In the production of alkali-metal carbamates from alkali-metal bicarbonates, the improvement which comprises subjecting the bicarbonate to treatment with an aqueous solution of ammonia containing about 75–95% by weight of NH₃ at a temperature upwards of 50° C.

12. In the production of alkali-metal carbamates from alkali-metal bicarbonates, the improvement which comprises subjecting the bicarbonate to treatment with an aqueous solution of ammonia containing about 75–95% by weight of NH₃ at a temperature upwards of 50° C., and separating the carbamate thus formed while maintaining the concentration of the aqueous ammonia solution at 35% or upwards of NH₃.

13. In the production of alkali-metal carbamates from alkali-metal bicarbonates, the improvement which comprises subjecting the bicarbonate to treatment with an aqueous solution of ammonia containing about 75–95% by weight of NH₃, at a temperature of 50°–90° C.

14. In the production of alkali-metal carbamates from alkali-metal bicarbonates, the improvement which comprises subjecting the bicarbonate to treatment with an aqueous solution of ammonia containing about 75–95% by weight of NH₃ at a temperature from 50°–90° C., and separating the carbamate thus formed while maintaining the concentration of the aqueous ammonia solution at 35% or upwards of NH₃.

15. In the production of alkali-metal carbamates from alkali-metal bicarbonates, the improvement which comprises subjecting the bicarbonate to treatment with anhydrous ammonia at a temperature upwards of 50° C.

ROBERT B. MacMULLIN.